United States Patent [19]

Anderson et al.

[11] Patent Number: 5,113,479
[45] Date of Patent: May 12, 1992

[54] METHOD OF INFRARED HEATING A RESTRICTED AREA ON A CONTINUOUS THERMOPLASTIC LAMINATED WEB

[75] Inventors: Anders Anderson, Staffanstorp; Tom Kjelgaard, Löddeköpinge, both of Sweden

[73] Assignee: Tetra Pak Holdings SA, Pully, Switzerland

[21] Appl. No.: 637,553

[22] Filed: Jan. 4, 1991

[30] Foreign Application Priority Data

Jan. 16, 1990 [SE] Sweden ............... 9000154

[51] Int. Cl.⁵ .................. B31B 1/66; F26B 13/10; D02J 13/00
[52] U.S. Cl. .................. 392/417; 53/482; 53/373.7; 156/275.1; 156/499; 156/380.9; 156/324
[58] Field of Search .......... 392/417; 219/388; 53/463, 450, 373.8, 373.7, 387.3, 477, 482, 547, 548; 156/272.2, 275.7, 275.1, 499, 322, 324, 380.9, 459

[56] References Cited

U.S. PATENT DOCUMENTS

| | | | |
|---|---|---|---|
| 2,575,544 | 11/1951 | Zinn, Jr. ......................... | 53/482 |
| 2,622,053 | 12/1952 | Clowe et al. .................... | 53/415 |
| 3,075,862 | 1/1963 | Hoyer ............................. | 156/275.1 |
| 3,189,702 | 6/1965 | Wall et al. ...................... | 156/275.1 |
| 3,477,194 | 11/1969 | Corrsin ........................... | 392/417 |
| 3,826,014 | 7/1974 | Helding .......................... | 392/417 |
| 3,861,124 | 1/1975 | Bentzien . | |
| 3,952,868 | 4/1976 | Muller et al. ................... | 156/272.2 |
| 3,997,385 | 12/1976 | Osborne ......................... | 156/275.1 |
| 4,156,626 | 5/1979 | Souder ............................ | 156/275.1 |
| 4,347,091 | 8/1982 | Hauck et al. . | |
| 4,461,661 | 7/1984 | Fabel .............................. | 156/275.3 |
| 4,571,486 | 2/1986 | Arai et al. ...................... | 392/417 |
| 4,606,784 | 8/1986 | Glans et al. .................... | 156/499 |
| 4,617,081 | 10/1986 | Bleau et al. . | |

Primary Examiner—Bruce A. Reynolds
Assistant Examiner—John A. Jeffrey
Attorney, Agent, or Firm—Burns, Doane, Swecker & Mathis

[57] ABSTRACT

A method of heating a portion of a continuous material strip includes heating the web through use of one or more IR lamps provided with radiation-concentrating reflectors. The IR lamps are directed towards a restricted area on the web to thereby heat the thermoplastic surface in the restricted area to a temperature that corresponds to the melting temperature of the thermoplastic. The web can be provided with a color strip in the restricted area, whereby the color strip absorbs the heat from the IR lamps.

11 Claims, 1 Drawing Sheet

METHOD OF INFRARED HEATING A RESTRICTED AREA ON A CONTINUOUS THERMOPLASTIC LAMINATED WEB

FIELD OF THE INVENTION

The present invention relates to a method of heating a continuous material web and more particularly, to a method whereby an IR lamp, or a of such lamps fitted with radiation-concentrating reflectors, is caused to heat a restricted area on a thermoplastic surface.

BACKGROUND OF THE INVENTION

Heating a restricted area of a packaging material sheet consisting of a thermoplastic with IR light in order to obtain a heated zone for, for instance, deep-drawing of plastic lids, is previously known in this Art.

Within the packaging industry, use is made of continuous material webs for packaging material. This packaging material normally consists of a paper or cardboard layer laminated on both sides with a thermoplastic. The laminate may also include a thin aluminium foil.

After production, the laminate is cut to suitable widths and stored on so-called jumbo reels. In a packaging machine, the packaging material is formed into a tube which is transversely sealed, cut in the transverse seals and finally formed into a finished package. In the majority of cases, it is necessary to protect the inner laminate edge when the packaging material is formed into a tube. This may be effected by sealing a loose thermoplastic strip against the inside of the laminate, alternatively, or by allowing a narrow edge of thermoplastic during, on production of the packaging material, to project out beyond the one laterally defining line of the laminate.

The thermoplastic edge, which may possibly be laminated with adhering aluminium foil, is, in a later process prior to the filling machine, to be folded over the open laminate edge and sealed against the laminate surface of thermoplastic. In this instance, it is necessary to heat the packaging material web before the edge is folded so that sealing of the edge against the laminate surface may take place. In this case, a restricted heating of the continuous material web is desirable. Also in the application of loose plastic strips, a restricted heating of the continuous material web is desirable.

According to prior art technology, the edge of the continuous material web has hitherto been heated, before the folding operation, by hot air. A hot air jet is directed from a hot air nozzle towards the edge of the continuous material web. In this instance, a scattered heating effect is obtained which is difficult to restrict in physical terms. In addition to the laminate edge, the thermoplastic edge is also heated, which results in the thermoplastic edge becoming soft and intractible for handling in a subsequent folding operation. This is particularly true when the thermoplastic edge is laminated with aluminium foil, since heating of the edge may entail crack-formation and creaseformation in the thin aluminium foil, with a resultant edge folding which is not completely gas-tight, which in turn may cause insterility in aseptic packaging. The subsequent folding operation may be effected with a series of rollers of different angles of inclination, or alternatively with a belt which folds over the edge.

OBJECT AND SUMMARY OF THE PRESENT INVENTION

One object of the present invention is to realise a method of heating a restricted area of a continuous material web without adjacent portions of the packaging material web being affected by the heat.

This and other objects will be attained according to the present invention in that the method involves the infra-red heating of a thermoplastic layer, wherein the thermoplastic surface is located on a continuous material web which consists of a paper or cardboard layer laminated with thermoplastic.

BRIEF DESCRIPTION OF THE ACCOMPANYING DRAWINGS

The nature of the present invention and its aspects will be more readily understood from the following description considered in connection with the accompanying drawing figures in which like elements bear like reference numerals and wherein:

FIG. 1 is a schematic illustration of how an IR lamp is aimed towards a continuous material web; and FIG. 2 is a top view of a part of the continuous material web.

DETAILED DESCRIPTION OF THE PREFERRED EMBODIMENT

Figure 1:
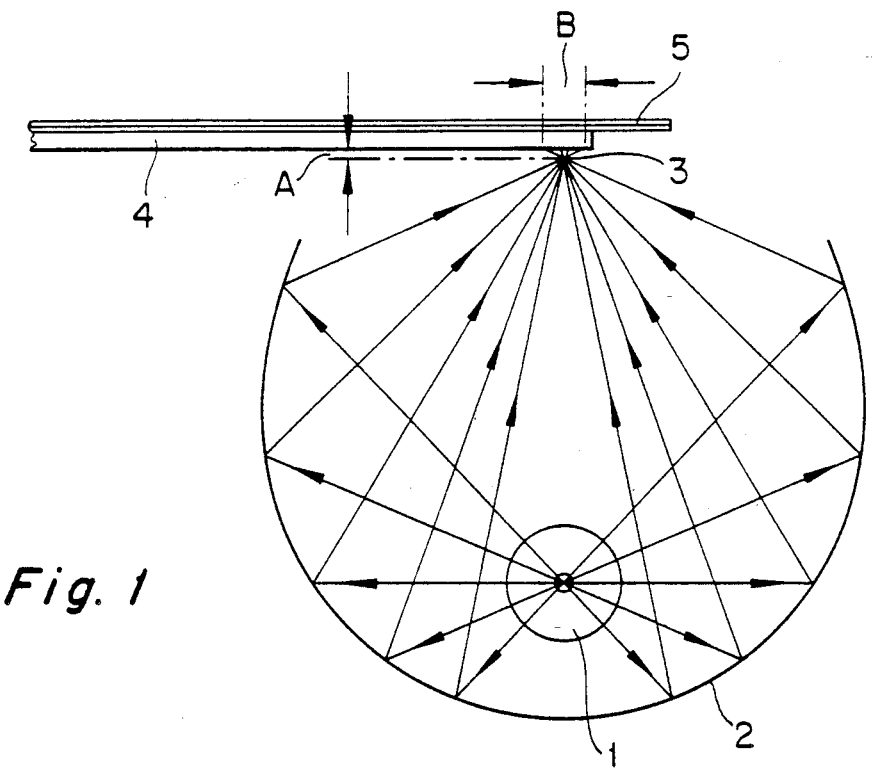

Referring to the Drawings, FIG. 1 shows an IR lamp 1 or alternatively an array of IR lamps connected in series, and fitted with a conventional reflector screen 2. The reflector 2 has a predetermined distance to a focal point 3 where radiation is concentrated. By placing the IR lamp 1 with the reflector 2 at a certain distance from a continuous material web 4, the focal point 3 will be directed at a position located a distance A ahead of the material web 4. This implies that the radiation behind the focal point 3 is scattered on the width B on the packaging material web 4. If the distance A is increased, the width B increases, and vice versa. Hence, B constitutes the restricted area 7 on the packaging material which is heated.

The number of IR lamps 1 connected in series depends upon the speed at which the web 4 is advanced, so that the greater the speed of advancement of the web 4, the larger will be the number of series-connected lamps 1 required in order to achieve the contemplated effect.

FIG. 1 also shows the thermoplastic edge 5 projecting out from the continuous material web, possibly laminated with aluminium foil.

When the continuous material web 4 passes the IR lamp 1 or the IR lamps connected in series to form an array the thermoplastic surface of the continuous material web 4 is heated to a temperature which corresponds to the melting point of the thermoplastic in a restricted area 7 immediately inside the projecting edge 5. The restricted heating area 7 then consists of a zone which extends along the edge of the continuous material web 4 in the direction of movement of the web 4.

When the heating operation is physically restricted in this manner, the edge 5 is not affected but may (being unheated and easily manageable) be folded over in a subsequent folding process using, for example, rollers or belts, and be sealed against a continuous material web 4 with a uniform and smooth seal, without any risk that the aluminium foil, which may possibly adhere to the thermoplastic, cracks or crinkles.

Figure 2:
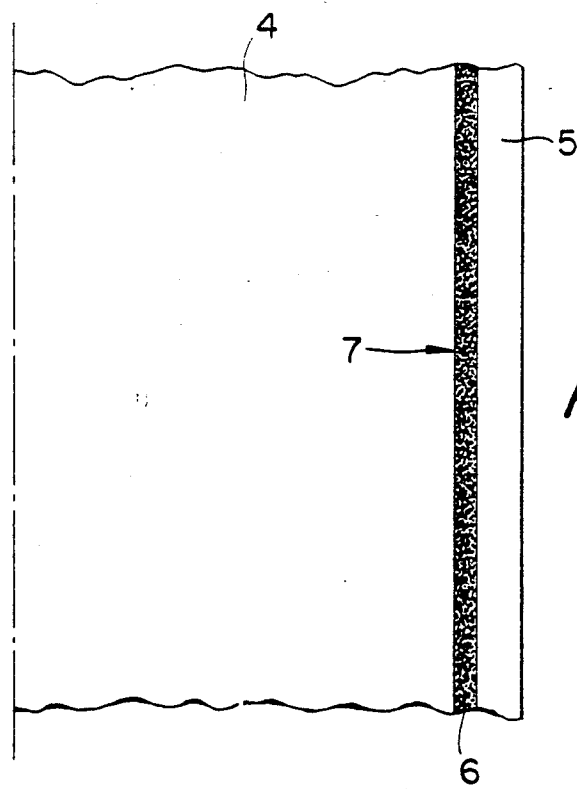

FIG. 2 illustrates a portion of the continuous material web 4 in which that area 7 which is to be heated before the folding process has been provided with a preprinted strip 6. This strip 6 is suitably printed on the continuous material web 4 in an earlier printing process when the graphic artwork is applied to the packaging material. The colour strip 6 consists of a dark, matted color, preferably black mat. The IR lamp 1 is selected so as to operate on a wavelength which is particularly adapted to respond to black.

On being exposed to heating from the IR lamp 1, the colour strip 6 will absorb the heat, and practical experiments have demonstrated that this process may reduce the power requirements for heating by as much as 50%.

The color strip 6 also contributes in concentrating the thermal radiation so that an insignificant amount of heat is scattered outside the color strip 6.

As is apparent from the foregoing, the present invention realises a method of heating a restricted area of a continuous material web without other parts of the web, above all the thermoplastic edge, being affected by the heat, with resultant negative consequences for the subsequent folding operation. While this invention has been illustrated and described in accordance with a preferred embodiment, it is recognized that variations and changes may be made and equivalents employed herein without departing from the invention as set forth in the claims.

What is claimed is:

1. A method of processing a continuous web that is used in the formation of packages for packaging products, comprising: providing a continuous web which includes a thermoplastic layer provided on a paper or cardboard layer and a projecting thermoplastic edge that extends beyond the paper or cardboard layer so that the projecting thermoplastic edge is thinner than portions of the web located adjacent the projecting thermoplastic edge; and heating a restricted area on a surface of the thermoplastic layer through the use of an IR lamp provided with radiation-concentrating reflectors, said step of heating including energizing the IR lamp and directing IR energy at the restricted area which is located inwardly of the projecting thermoplastic edge so as to heat the thermoplastic surface in the restricted area while avoiding heating of the projecting thermoplastic edge.

2. The method according to claim 1, wherein said web continuously moves during the heating step, said restricted area extending along the web in the direction of movement of the web.

3. The method according to claim 1, wherein the restricted area is formed by pre-printing a dark color strip on the web, said dark color strip absorbing heat from the lamp during heating of the thermoplastic surface.

4. The method according to claim 1, wherein said restricted area on the web is heated with an array of IR lamps.

5. The method according to claim 1, wherein after the thermoplastic surface is heated, said web is formed into finished packages for packaging products, said web being formed into finished packages by folding the unheated projecting thermoplastic edge over the heated restricted area and sealing the folded projecting thermoplastic edge to the restricted area.

6. A method of processing a continuous web that is used in the formation of packages for packaging products, comprising heating a continuous web having a thermoplastic layer laminated on opposite sides of a paper or cardboard layer through use of at least one IR lamp provided with radiation-concentrating reflectors, the continuous web having a projecting thermoplastic edge that extends beyond the paper or cardboard layer so that the projecting thermoplastic edge is thinner than the remainder of the web, said heating step including energizing the at least one IR lamp and directing IR energy to a restricted area on the web positioned inwardly of the projecting thermoplastic edge so that the heating of the thermoplastic surface is limited to the restricted area to thereby avoid heating the thermoplastic projecting edge.

7. The method according to claim 6, including the step of folding the thermoplastic projecting edge over the restricted area of the thermoplastic surface that has been heated and sealing the thermoplastic projecting edge thereto.

8. The method according to claim 6, including forming the continuous web into individual finished packages for packaging products.

9. The method according to claim 6, wherein the thermoplastic surface is heated in only one restricted area that extends longitudinally along the length of the web.

10. The method according to claim 9, wherein said web continuously moves during the heating step, said restricted area extending along the web in the direction of movement of the web.

11. The method according to claim 10, wherein the restricted area is formed by pre-printing a dark color strip on the web, said dark color strip absorbing the heat from the at least one lamp.

* * * * *